No. 682,049. Patented Sept. 3, 1901.
M. F. ELLIS.
ANIMAL POKE.
(Application filed May 28, 1901.)
(No Model.)
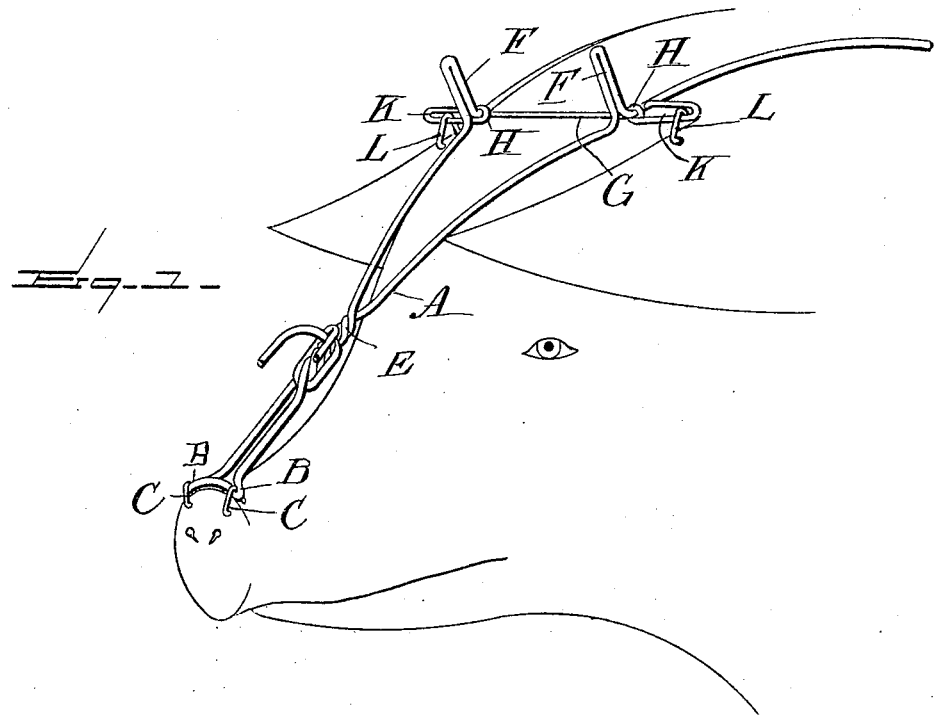
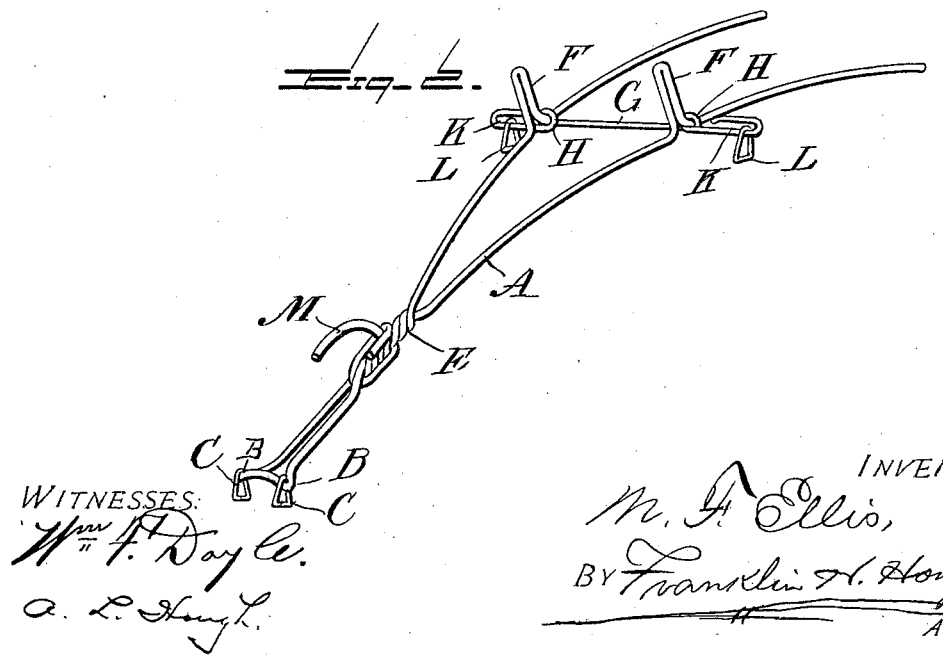
WITNESSES:
Wm F. Doyle.
A. L. Hough.
INVENTOR
M. F. Ellis,
BY Franklin N. Hough
Attorney
THE NORRIS PETERS CO., PHOTO-LITHO., WASHINGTON, D. C.

UNITED STATES PATENT OFFICE.

MILLARD F. ELLIS, OF GHENT, KENTUCKY.

ANIMAL-POKE.

SPECIFICATION forming part of Letters Patent No. 682,049, dated September 3, 1901.

Application filed May 28, 1901. Serial No. 62,220. (No model.)

*To all whom it may concern:*

Be it known that I, MILLARD F. ELLIS, a citizen of the United States, residing at Ghent, in the county of Carroll and State of Kentucky, have invented certain new and useful Improvements in Pokes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in yokes or pokes especially adapted for attachment to the head of a hog to prevent the animal from rooting or going through fences; and the object of the invention is to produce a poke which will keep the animal within a fence-inclosure.

The invention will be hereinafter more fully described and then specifically defined in the appended claims and is clearly illustrated in the accompanying drawings, which, with the letters of reference marked thereon, form part of this application, and in which—

Figure 1 is a perspective view of my improved yoke or poke shown as applied to the head of a hog, and Fig. 2 is an enlarged detail view of the poke detached.

Reference now being had to the details of the drawings by letter, A designates the body portion or frame of the poke, which is made, preferably, of a single piece of galvanized or other iron wire, which is bent upon itself at the points B, forming a right-angled projection with loops, which carry the nostril-engaging rings C C. This end of the poke is curved inwardly slightly, as well as laterally, so as to fit the nose of the animal. The shank portions of the poke are twisted, as at E, once about each other, and the two upwardly-projecting arms are bent upon themselves to form the projections F F, one in each arm, these projections being forwardly and upwardly inclined and provided as means to engage the boards of a fence or other inclosure for the purpose of retaining an animal having a poke secured to its head within the inclosure. The upper ends or arms of the poke are curved backward and adapted to be disposed adjacent to the head of the animal back of the ears. Mounted upon the portion of the poke above said projections F is a cross-piece G, which is coiled at two locations H, forming eyes which are adapted to engage over the upper portions of said arms, and the downward throw of said cross-piece is limited by said projections. The ends of the cross-piece are bent to form loops K, in which ear-rings L are fastened. These ear-rings are designed to engage in apertures in the ear of the animal adjacent to the head.

In order to afford further precaution against hogs going through a fence when equipped with a poke embodying the construction of my invention, I provide an auxiliary hook M, which is formed by a piece of wire which is bent upon itself and passed through between the points of the shank portion of the poke, one end being bent about the other at a location adjacent to the twisted shank portions of the poke, while the other end projects forward and is downwardly bent.

When the device is applied to an animal by passing the nose-rings through apertures which have been made through the cartilaginous part of the nose and the ear-rings through the ears an animal is effectually prevented from rooting and from crawling through between the panels or boards of a fence, while at the same time the animal has perfect freedom in the use of its mouth for feeding purposes.

Having thus described my invention, what I claim to be new, and desire to secure by Letters Patent, is—

1. A poke for hogs, comprising a piece of wire having shank portions, the wire being bent upon itself at two points forming a lateral projection with eyes at the ends thereof, nose-rings engaging said eyes, the shank portions of the poke being twisted about each other, upwardly-inclined projections formed above said twisted portion by bending the shank portions of the poke upon themselves, a cross-piece made of wire carried upon the upper ends of said shank portions and supported by said projections, and ear-engaging rings carried at the ends of said cross-piece.

2. In combination with the poke comprising a piece of wire bent at points B to form laterally-projecting loops at the lower end of the poke, nose-rings engaging said projecting loops, the shank portions of the poke twisted about each other, the upper rearwardly-curved arms of the poke bent upon themselves forming forward projections F, a crosspiece of wire bent to form two eyes which engage over said upper arms, and are supported by said projections, the ends of the crosspiece having eyes, ear-rings engaging said eyes, and a wire bent upon itself and passing through the coiled portions of the poke, one end of said wire bent forwardly and downwardly disposed to form a hook, as set forth.

In testimony whereof I hereunto affix my signature in presence of two witnesses.

MILLARD F. ELLIS.

Witnesses:
W. F. DINGUID,
C. H. DUNCAN.